WILLIAM TYLER.
Improvement in Dough-Kneaders.
No. 114,993.  Patented May 16, 1871.
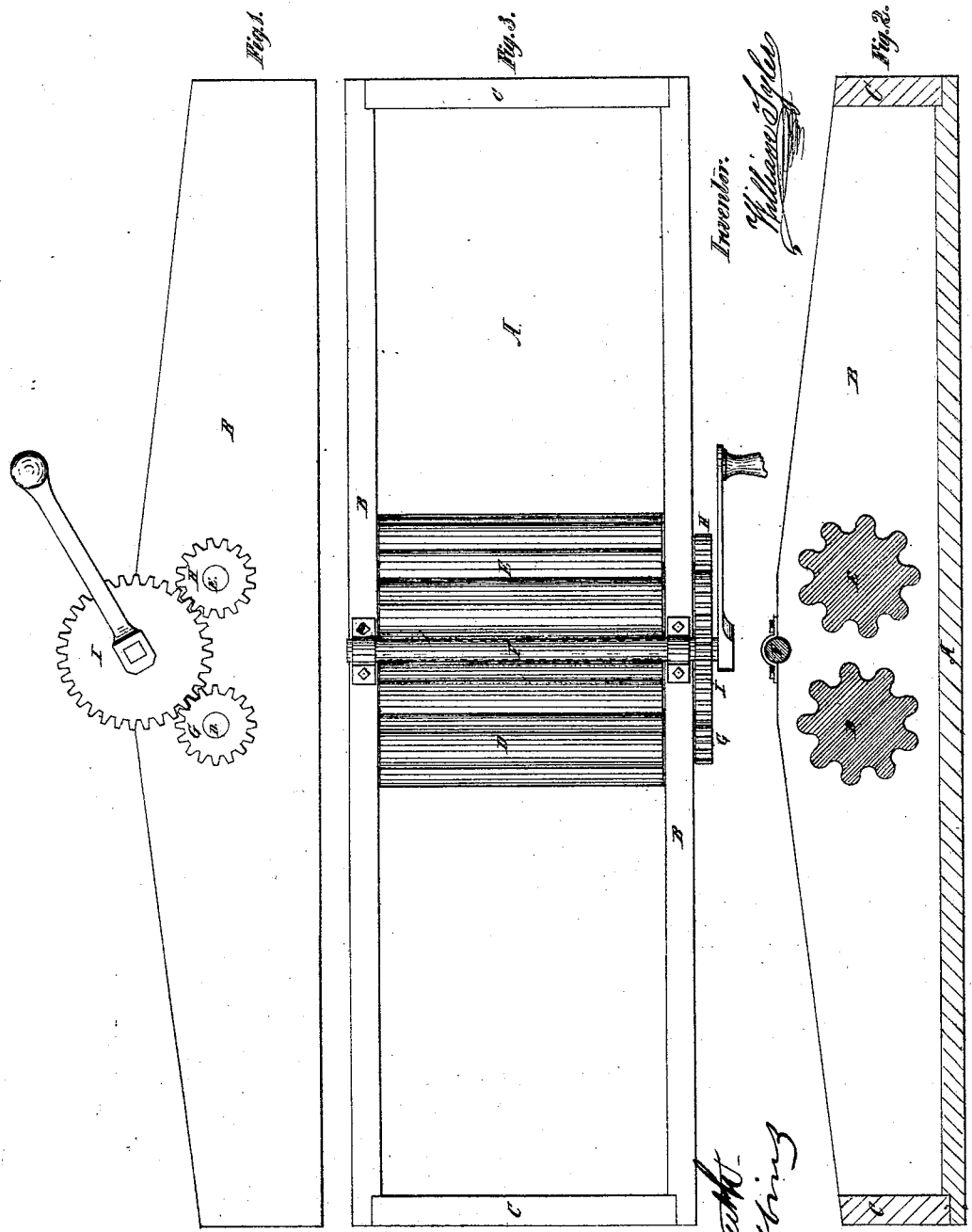

UNITED STATES PATENT OFFICE.

WILLIAM TYLER, OF GEORGETOWN, DISTRICT OF COLUMBIA.

IMPROVEMENT IN DOUGH-KNEADERS.

Specification forming part of Letters Patent No. 114,993, dated May 16, 1871.

*To all whom it may concern:*

Be it known that I, WILLIAM TYLER, of Georgetown, in the county of Washington and District of Columbia, have invented a new and useful Improvement in Machines for Kneading Dough; and I do hereby declare that the following is a full, clear, and exact description of the same, reference being had to the accompanying drawing, through letters of reference marked thereon, forming part of this specification, and in which—

Figure 1 represents a side elevation of the machine; Fig. 2, a central longitudinal section thereof, and Fig. 3 a plan or top view of the same.

The same letters occurring on the several figures indicate corresponding parts.

In the operation of a kneading-machine two actions are necessary—namely, a crushing or pressing and a drawing or rubbing movement—and in some machines heretofore devised the one, and in others the other, is exhibited; but in all in which the drawing or rubbing action is found, a difficulty arises from the backing up or clogging of the roller for want of mechanical agency to keep the dough in motion, and thereby clear it from the roller.

To obviate this difficulty is the object of my invention; and it consists in combining with the kneading-roller an auxiliary or draft roller, both operated in unison by an intermediate gear in such manner that in rotating them in one direction the one becomes the kneading and the other the draft roller, while in rotating them in the opposite direction their respective functions are reversed.

Referring to the drawing, A represents the bed or table on which the dough is to be kneaded; B, the sides, and C the end inclosures or guards to prevent waste.

In the sides B are provided suitable bearings for the journals of the shafts of the two rollers D and E and the shaft F, carrying the intermediate driving-gear I.

The rollers D and E are fluted longitudinally, and on the outer extremity of their axes, at one end, are fitted with gear-wheels G and H, into which a third gear, I, on the shaft F is arranged to mesh, so that on rotating the latter the rollers D and E will both be rotated in the same direction.

In operating this machine in either direction, according to the position of the dough to be acted on, the roller D or E, whichever is toward the work, acts as a kneading-roller, by both drawing or rubbing and pressing the dough as it is fed toward it, and after having passed its action the dough is seized by the other roller and drawn forward, thus preventing any possibility of its lateral expansion, which might cause it to clog or bank up against the kneading-roller.

This action is the same whichever way the rollers are turned—the one acting as a kneader, the other as a clearer, and vice versa.

What is here claimed, and desired to be secured by Letters Patent, is—

The combination, with the dough-trough A, of the kneading-roller and auxiliary draft-rollers D and E, arranged to operate in unison, and to act alternately in such capacities, according to the direction in which they are rotated, substantially as shown and described.

In testimony whereof I hereunto set my hand before two subscribing witnesses this 14th day of April, 1870.

WILLIAM TYLER.

Witnesses:
GEO. R. NICHOLL,
SYDNEY E. SMITH.